March 12, 1935. H. MÜLLER 1,994,418
SYNCHRONIZING AND CONNECTING SYSTEM
Filed Feb. 2, 1933
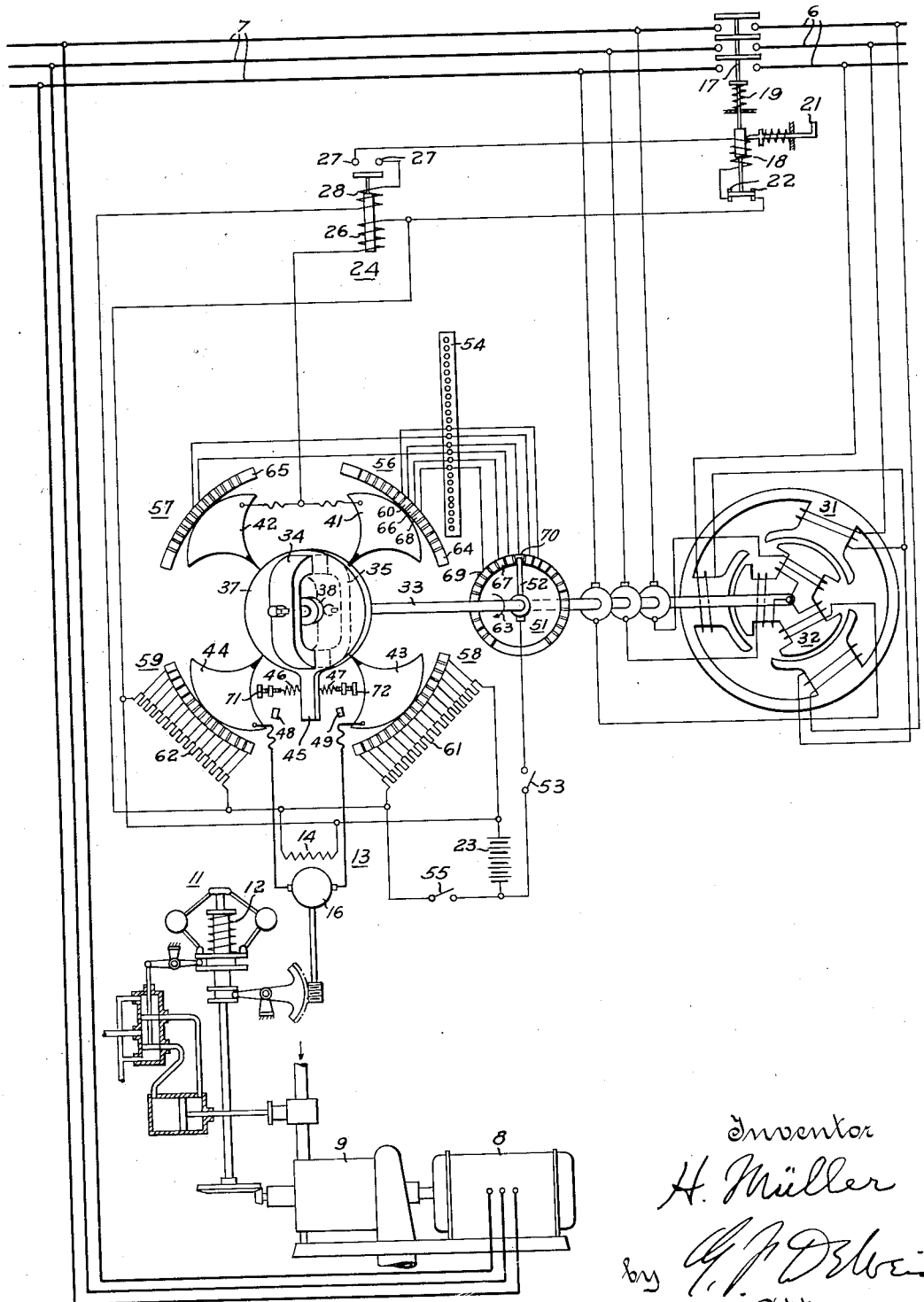

Patented Mar. 12, 1935

1,994,418

UNITED STATES PATENT OFFICE 1,994,418

SYNCHRONIZING AND CONNECTING SYSTEM

Hans Müller, Ennetbaden, Switzerland, assignor to Aktiengesellschaft Brown Boveri & Cie., Baden, Switzerland, a joint-stock company of Switzerland Application February 2, 1933, Serial No. 654,814
In Germany February 17, 1932

16 Claims. (Cl. 171—118)

This invention relates to improvements in systems for connecting sources of alternating current or alternating current transmission lines, and more particularly to systems whereby alternating current sources or lines may be automatically synchronized and whereby the operation for connecting such sources or lines may be so automatically initiated as to be completed when the voltages of the sources or lines are in exact phase coincidence.

When it is desired to connect alternating current sources or lines, such sources or lines must be at substantially the same frequency and in substantial phase coincidence at the time of connection. An appreciable difference in the frequencies may be tolerated, as, upon connection of sources at appreciably different frequencies, such sources bring themselves to exact synchronism by the flow of circulating current therebetween over a period of several cycles. Phase coincidence at the time of connection must, however, be closely observed as otherwise the connection causes, between the sources, a short circuit which is more or less severe depending upon the degree of departure of the sources from phase coincidence. To obtain such close phase coincidence, it is necessary first to bring the frequencies of the two sources to very nearly equality; otherwise the phase coincidence is too difficult to observe so that the synchronizing operation is frequently lengthy and difficult. If operation of the connecting means for the two sources requires an appreciable length of time, the correct connecting operation is thereby rendered the more difficult.

By providing automatic means for energizing the connecting means at a time preceding the moment of phase coincidence by a constant interval independent of the difference of the frequencies of the source, the connecting means may be made to complete the connecting operation when the two sources are exactly in phase. The range of frequency differences between the two sources within which the connecting operation may be effected may then be increased to the highest value which will not cause the sources to fall out of step upon being connected. If the frequency of one of the sources can be controlled from the same points as the connecting operation, the frequency of such source is preferably automatically adjusted by the system controlling the connecting means between the two sources.

It is, therefore, among the objects of the present invention to provide a system for automatically controlling the frequency of an alternating current source in dependence on the frequency of another alternating current source.

Another object of the present invention is to provide a system for automatically connecting two alternating current sources when such sources are within a predetermined degree of synchronism in which system the connecting operation is initiated at such time as to be completed at the time of exact phase coincidence of the two sources.

A further object of the present invention is to provide a system for automatically controlling the frequency of an alternating current source and for causing automatic connection of such source with another alternating current source when the two sources are within a predetermined range of frequency and in exact phase coincidence.

Objects and advantages other than those above set forth will be apparent from the following description when read in connection with the accompanying drawing which diagrammatically illustrates one embodiment of the present invention operable to automatically synchronize an alternating current generator with an alternating current line and to automatically connect the synchronized generator with the line when the several voltages thereof are within a predetermined degree of synchronism and in exact phase coincidence.

Referring more particularly to the drawing by characters of reference, reference numeral 6 designates a polyphase alternating current line operated at any desired frequency. The frequency of line 6 will be assumed as being maintained at a constant value but it will be understood that such frequency may vary due to the method of controlling of the generator (not shown) energizing such line without in any way influencing the operation of the system herein described. Another line 7 normally operating at the same number of phases and the same frequency as line 6 may be energized by a generator 8 driven by a suitable prime mover herein illustrated as a steam turbine 9. Turbine 9 is provided with a speed governor 11 operating against the compression of a spring 12. The compression of spring 12 may be adjusted in a well known manner by means of a motor 13 having a field 14 and an armature 16 which may be energized at opposite polarities to cause rotation of such armature in the one or in the other direction. Lines 6 and 7 may be connected by means of a circuit breaker 17 which is closed against the action of a spring 19 upon energization of a closing coil 18 and which is maintained in the closed position by a latch 21 which is released when the circuit breaker is to be opened. Coil 18 may be energized from a source 23 over contacts 22. The operation of circuit breaker 17 is controlled by a relay 24 having a coil 26 and provided with contacts 27 in series with a holding coil 28. The connections between relay 24 and circuit breaker 27 are such that, when coil 26 is energized, relay 24 closes its contacts 27 and maintains such contacts closed until circuit breaker 17 has reached the closed position thereof and has opened the circuit of coil 18 and of contacts 27 at contacts 22.

The system of the present embodiment of the invention is actuated by a synchronizing and controlling device comprising a stator 31 having a winding energized from line 6 and a rotor 32 having a winding energized from line 7 over the usual slip rings. The winding of stator 31 produces therein a rotating field making one revolution for each cycle of the voltage of line 6 and the winding of rotor 32 likewise induces therein a rotating field making one revolution for each cycle of line 7. The two rotating fields always tend to remain in coincidence in their rotation and thus cause rotor 32 to rotate at a speed equal to the difference of the frequencies of the voltages of lines 6 and 7. The position of rotor 32 at any moment is then determined by the phase relation of the voltages of lines 6 and 7 at such moment. In particular, if the two lines have the same frequencies rotor 32 remains in a predetermined position. When the voltages of lines 6 and 7 are in momentary or continuous phase coincidence rotor 32 is in a position which is assumed to be the position illustrated in the drawing. Such position is the same whether the voltages of lines 6 and 7 have the same frequency or frequencies differing by any amount provided the voltages of the lines are in phase coincidence. Rotor 32 is fixedly mounted on a spindle 33 which carries two permanent magnets 34 and 35 fixedly mounted thereon. Magnets 34 and 35 constitute a closed magnetic circuit having two air gaps in the magnetic circuit formed thereby and receiving a disk 37 mounted on the hub 38 which may rotate about the spindle 33. When spindle 33 rotates, magnets 34 and 35 induce eddy currents in disk 37 which cause the magnets to tend to drag disk 37 in their direction of rotation and produce, in effect, a magnetic slip clutch. Disk 37 is provided with an extension 45 and is prevented from continuously rotating by springs 46 and 47 connected with such extension and with adjusting screws 71 and 72. The extent of rotation of disk 37 is limited by stops 48 and 49. Disk 37 is used as an operating member for a control system including a plurality of sectors 41, 42, 43, 44 insulated therefrom and rocking on circular paths 56, 57, 58 and 59, each constituted of a plurality of conductive segments separated by insulation. The sectors and the circular paths constitute a plurality of distributor switches or tap changers as will be explained hereinafter. Spindle 33 also carries the brush 52 of a distributor switch 51 having a plurality of conductive segments connected with the terminals of a terminal block 54. Brush 52 may be connected with source 23 directly or through a hand operated switch 53. The terminals of terminal block 54 may be connected with the segments of distributor 56 only but are preferably also connected with segments of distributor 57. In the present embodiment the number of active segments of distributors 56 and 57, are such and the connection of such segments are so effected at terminal block 54 that successive segments of distributor 51 are alternately connected with successive segments of distributors 56 and 57. Sectors 41 and 42 are connected with coil 26 of relay 24 to permit energization thereof from source 23 upon closing of a control switch 55. If spindle 33 is at rest or rotates at a very low speed, sectors 41 and 42 are maintained in the median position thereof by the action of springs 46 and 47 acting on extension 45 of disk 37. Sector 41 is then in contact with a segment such as 60 connected with a segment 70 of distributor 51 thereby, assuming that switch 55 is closed, closing the circuit of coil 26 when brush 52 is in position shown, which is assumed to be the position determined by the phase coincidence condition of the voltages of lines 6 and 7. When spindle 33 is rotated by rotor 32, sector 41 comes into contact with another segment such as 66 which is connected with a segment 67 of distributor 51 in such manner that, during the rotation of spindle 33, brush 52 closes the circuit of coil 26 over contact 67 in advance of phase coincidence of the voltages of lines 6 and 7 by the time interval equal to the time necessary for brush 52 to reach contact 70. Springs 46 and 47 are so adjusted that segments 66 and 67 will be in circuit at such time that the circuit of coil 26 over such segments is closed in advance of phase coincidence of the voltages of lines 6 and 7 by a time interval equal to the time required for completing the operation of relay 24 and circuit breaker 17, so that the lines are actually connected at the time of exact phase coincidence of their voltages.

The segments of distributors 58 and 59 are connected in parallel with resistances 61 and 62 which are energized from source 23 over switch 55. Sectors 43 and 44 are connected with the brushes of armature 16 and thus energize such armature with current at the one or the other polarity depending upon the position of sectors 43 and 44 as determined by the position of disk 37.

In operation, assuming the system to be connected as shown in the drawing and line 6 to be energized, generator 8 being at a standstill, line 7 will be in the unenergized condition. Stator 31 then produces a rotating field rotating at the frequency of the voltage of line 6 and driving rotor 32 synchronously in a direction assumed to be that of arrow 63. Magnets 34 and 35 then exert a large torque on disk 37 and cause such disk to rotate until extension 45 rests against stop 48 against the action of spring 47. Segments 41 and 42 are then in contact with a pair of idle segments 64 and 65 which do not provide for closure of the circuit of coil 26. Upon closure of switch 55, sectors 43 and 44 impress the full voltage of source 23 on armature 16 thereby increasing the compression of spring 12 and causing the throttle valve of turbine 9 to be fully opened. Turbine 9 being supplied with steam, assuming that generator 8 is excited, line 7 and rotor 32 will be energized at voltages of increasing frequency as turbine 9 tends to reach the normal operating speed thereof. Rotor 32, therefore, rotates at a decreasing speed and finally remains at a standstill when the frequency of the voltage of line 7 reaches the frequency of the voltage of line 6. The torque exerted by magnets 34 and 35 on disk 37 thus gradually decreases to permit disk 37 to return to the median position thereof under the action of spring 47. During such motion of disk 37, sectors 43 and 44 gradually return towards air median position and impress decreasing voltages on armature 16 which voltages decrease to zero when sectors 43 and 44 reach their median position. In general, the speed of turbine 9 will increase beyond the normal operating speed thereof causing the frequency of the voltages delivered by generator 8 to exceed the frequency of the voltages of line 6. Spindle 33 is then driven in the direction opposite to that of arrow 63 by rotor 32, thereby causing disk 37 to rotate against the action of spring 46. Sectors 43 and 44 then impress a voltage opposite in polarity to the voltages previously impressed on armature 16 thereby causing such armature to rotate in a direction to decrease the compression of spring 12 and to cause partial closure of the throttle valve of turbine 9. The speed of turbine 9 will then decrease below the normal operating value thereof thus causing the frequency of the voltage of the generator 8 to fall below the value of the frequency of the voltage of line 6 and thereby causing the system to again operate as during the beginning of the starting operation. Governor 11 is thus controlled in response to the action of motive system 31, 32 to cause the speed of turbine 9 and therefore also the frequency of the voltages of generator 8 to oscillate above and below the operating values thereof within a predetermined range in which connection of lines 6 and 7 is permissible without causing excessive disturbances within such lines.

Assuming that it is desired to effect the closure of circuit breaker 17, switch 53 is then closed manually. Assuming that the frequency of the voltages of line 7 is lower than that of the voltages of line 6 at the instance considered, sector 41 is then in contact with a segment such as 66 due to the rotation of spindle 33 in the direction of arrow 63. During such rotation, the brush 52 comes sequentially into contact with the different segments of distributor 51 and in particular comes into contact with segment 67 thereby closing a circuit from source 23 over switch 53, brush 52, segment 67, segment 66, sector 41, coil 26, back to source 23. Relay 24, therefore closes contacts 27, thereby causing closure of circuit breaker 17 as described above. As already stated, the segments of distributors 51, 56 and 57 are so connected and springs 46 and 47 so adjusted that brush 52 comes in contact with segment 67 at a time preceding phase coincidence of the voltages of lines 6 and 7 by a time interval equal to the operating time of relay 24 and circuit breaker 17. The contacts of circuit breaker 17 then close upon exact phase coincidence of the voltages in lines 6 and 7 at which time brush 52 is in contact with segment 70.

Considering another instance in which switch 53 is closed when the difference between the frequencies of the voltages in lines 6 and 7 is twice as great as in the instance considered above, spindle 33 then rotates at twice the speed it has previously and sector 41 is then in contact with another segment such as 68. Segment 68 is connected with a segment 69 of distributor 51 which is removed from segment 70 by twice the distance between segments 67 and 70. During the rotation of spindle 33, brush 52 then comes in contact with segment 69 in advance of the phase coincidences of the voltages of lines 6 and 7 by a time interval which is the time required for brush 52 to travel from segment 69 to segment 70, as such segment 70 is always reached by brush 52 at the time of phase coincidence. The travel of brush 52 between segments 69 and 70 is twice the travel of such brush between segments 67 and 70 but, such travel being accomplished at twice the speed considered in the previous instance, brush 52 in this instance also closes the contact of coil 26 at such time as to cause connection of lines 6 and 7 at the moment of phase coincidence of their voltages. It will be understood that, if the frequency of the voltages of line 7 is higher than that of the voltages of line 6, the process of connection is entirely similar to that above described, except that the motion of spindle 33 then occurs in a direction opposite to that of arrow 63.

The system may be adjusted to operate in conjunction with relays and circuit breakers having any desired operating time by adjustment of springs 46 and 47 by means of screws 71 and 72, which adjustment determines the position of sectors 41 and 42 for each speed of spindle 33. Such adjustment therefore permits uninterrupted or uniform variation of the speed of operation but also changes the range of frequencies within which the lines may be connected as such adjustment also determines the speed of spindle 33 at which sectors 41 and 42 cease to be in contact with the inactive segments 64 and 65. The adjustment of the system may also be effected by changing the connections between the segments of distributors 56 and 57 and the segments of distributor 51 at terminal block 54. Such change of connections does not permit continuous or gradual adjustment of the speed of operation of the system but has the advantage that it does not change the range of frequencies within which the system operates.

It will be understood that switch 53 may be permanently closed so that the lines are connected as soon as the frequency of the voltages of line 7 reaches the value at which sectors 41 and 42 leaves segments 64 and 65. The lines are then connected when the difference of the frequencies of their voltages is at the largest permissible value and such connection is obtained at the earliest possible moment after starting of turbine 9, thereby permitting the connection of lines 6 and 7 within the shortest possible time after turbine 9 is put into operation.

It will be understood that, in automatic generating stations or generating stations provided with supervisory control, the above described system may be combined with automatic means for controlling the closure of switches 55 and 53 and with means for automatically initiating the admission of operating fluid to the prime mover of the generator.

Although but one embodiment of the present invention has been illustrated and described, it will be apparent to those skilled in the art that various modifications and changes may be made therein without departing from the spirit of the invention or from the scope of the appended claims.

It is claimed and desired to secure by Letters Patent:

1. In a system for synchronizing and connecting a plurality of sources of alternating current, an alternating current line at any desired frequency, a source of alternating current to be connected with said line, a circuit breaker for connecting said line with said source of alternating current, means for operating said circuit breaker, a source of electric current arranged to be connected with said circuit breaker operating means, and a synchronizing device for determining the moment of exact phase coincidence of said line with said source of alternating current and for connecting said circuit breaker operating means with said source of electric current prior to occurrence of phase coincidence, said device comprising a motive system connected with said line and with said source of alternating current, a system for partially controlling operation of said circuit breaker, a slip clutch connecting the motive system with the control system, and a distributor operated by the motive system to cooperate with the control system in controlling operation of said circuit breaker.

2. In a system for synchronizing and connecting a plurality of sources of alternating current, an alternating current line at any desired frequency, a source of alternating current to be connected with said line, a circuit breaker for connecting said line with said source of alternating current, means for operating said circuit breaker, a source of electric current arranged to be connected with said circuit breaker operating means, and a synchronizing device for determining the moment of exact phase coincidence of said line with said source of alternating current and for connecting said circuit breaker operating means with said source of electric current prior to occurrence of phase coincidence, said device comprising a motive system including a stator portion receiving potential from said line and a rotor portion receiving potential from said source of alternating current, a control system including a plurality of distributor switches for partially controlling operation of said circuit breaker, a slip clutch connecting the motive system with the control system, and a distributor operated by the motive system to cooperate with the control system in controlling operation of said circuit breaker.

3. In a system for synchronizing and connecting a plurality of sources of alternating current, an alternating current line at any desired frequency, a source of alternating current to be connected with said line, a circuit breaker for connecting said line with said source of alternating current, means for operating said circuit breaker, a source of electric current arranged to be connected with said circuit breaker operating means, and a synchronizing device for determining the moment of exact phase coincidence of said line with said source of alternating current and for connecting said circuit breaker operating means with said source of electric current prior to occurrence of phase coincidence, said device comprising a motive system connected with said line and with said source of alternating current, a system for partially controlling operation of said circuit breaker, a slip clutch transmitting a torque dependent on the speed of the motive system and connecting the motive system with the control system, and a distributor operated by the motive system to cooperate with the control system in controlling operation of said circuit breaker.

4. In a system for synchronizing and connecting a plurality of sources of alternating current, an alternating current line at any desired frequency, a source of alternating current to be connected with said line, a circuit breaker for connecting said line with said source of alternating current, means for operating said circuit breaker, a source of electric current arranged to be connected with said circuit breaker operating means, and a synchronizing device for determining the moment of exact phase coincidence of said line with said source of alternating current and for connecting said circuit breaker operating means with said source of electric current at such time prior to exact phase coincidence as to cause closure of said circuit breaker at such exact phase coincidence between said line and said source of alternating current, said device comprising a motive system connected with said line and with said source of alternating current, a system for partially controlling operation of said circuit breaker, a slip clutch connecting the motive system with the control system, a distributor operated by the motive system to cooperate with the control system in controlling operation of said circuit breaker, and means for adjusting the operation of the control system to cause closure of said circuit breaker upon the occurrence of the said exact phase coincidence.

5. In a system for synchronizing and connecting a plurality of sources of alternating current, an alternating current line at any desired frequency, a source of alternating current to be connected with said line, a circuit breaker for connecting said line with said source of alternating current, means for operating said circuit breaker, a source of electric current arranged to be connected with said circuit breaker operating means, and a synchronizing device for determining the moment of exact phase coincidence of said line with said source of alternating current and for connecting said circuit breaker operating means with said source of electric current prior to occurrence of phase coincidence, said device comprising a motive system including a stator portion receiving potential from said line and a rotor portion receiving potential from said source of alternating current, a control system including a plurality of distributor switches for partially controlling operation of said circuit breaker, a slip clutch connecting the motive system with the control system, and a distributor having a plurality of conductive segments connected with the distributor switches of the control system and having a brush operated by the motive system and connected with said source of electric current to cooperate with the control system in controlling operation of said circuit breaker.

6. A device for synchronizing and connecting a plurality of alternating current lines comprising a motive system including a rotor and a stator separately supplied with potential from the alternating current lines, a control system including means for regulating the frequency of one of the lines and means for controlling connection of the lines, and a slip clutch connecting said motive system with said control system to operate the latter.

7. A device for synchronizing and connecting a plurality of alternating current lines comprising a motive system including a rotor and a stator separately supplied with potential from the alternating current lines, a control system including means for regulating the frequency of one of the lines and means for controlling connection of the lines, a slip clutch connecting said motive system with said control system to operate the latter, and means for adjusting the operation of said control system to vary the time of operation thereof.

8. A device for synchronizing and connecting a plurality of alternating current lines comprising a motive system including a rotor and a stator separately supplied with potential from the alternating current lines, a control system including means for regulating the frequency of one of the lines and means for controlling connection of the lines, a slip clutch having an element connected with and operated by said motive system and an element connected with and operating said control system, the first said element being operable to impart a torque to the second said element in magnitude in dependence on the speed of said motive system and adjustable springs for controlling the position of the said second element.

9. A device for synchronizing and connecting a plurality of alternating current lines comprising a motive system including a rotor mounted on a spindle and a stator separately supplied with potential from the alternating current lines, a control system including static and movable elements for regulating the frequency of one of the lines and static and movable elements for controlling connection of the lines, and a slip clutch including a magnet and an inductive disk mounted on the spindle of said motive system, the movable elements of said control system being mounted on and operated by said disk, and the said disk being operated by said magnet responsive to movement of the latter by the rotor of said motive system.

10. A device for synchronizing and connecting a plurality of alternating current lines comprising a motive system including a rotor mounted on a spindle and a stator, the rotor and stator being separately supplied with potential from the alternating current lines, a control system including static and movable elements for regulating the frequency of one of the lines and static and movable elements for controlling connection of the lines, a slip clutch including a magnet and an inductive disk mounted on the spindle of said motive system, the movable portions of said control system being mounted on and operated by said disk responsive to movement of the latter by said magnet when rotated by the rotor of said motive system, and means for adjusting the operation of the disk to vary the operation of said control system.

11. A device for synchronizing and connecting a plurality of alternating current lines comprising a motive system including a rotor mounted on a spindle and a stator, the rotor and stator being separately supplied with potential from the alternating current lines, a control system including static and movable elements for regulating the frequency of one of the lines and static and movable elements for controlling connection of the lines, a slip clutch including a magnet and an inductive disk mounted on the spindle of said motive system, the movable elements of said control system being mounted on and operated by said disk, the disk being rotatable by said magnet, when operated by said rotor, an amount dependent on the speed of said motive system, and adjustable springs for controlling the operation of the disk.

12. In apparatus of the character described, a plurality of spaced electro-magnetically coupled relatively movable members, means operable when energized from two different alternating electromotive forces for moving one of said members in a continuous direction at a speed in dependence on the difference between the frequencies of said electromotive forces for imparting a torque to another of said members in magnitude in dependence on the speed of movement of the said one of said members to thereby displace the said another of said members in extent in dependence on the said torque imparted thereto, a plurality of distributors each comprising a plurality of spaced electrically conductive segments and a cooperating brush, the brush of one of said distributors being connected with and operated by said means at the speed thereof into engagement with the associated said segments, the brush of another of said distributors being connected with and operated by the said another of said members into engagement with such successive ones of the associated said segments as determined by the said torque imparted to said another of said members, and means connecting successive segments of the said one of said distributors severally with such segments of the said another of said distributors as to control an electric circuit upon the coincident engagement of said brushes with interconnected ones of the segments of the respective said distributors.

13. In combination, a plurality of electric circuits, means for controlling one of said circuits with respect to another thereof and comprising an actuating member, motive means comprising elements severally connected with said circuits and energized therefrom to cause relative movement between said elements at speeds in dependence on differences in voltage conditions of said circuits, and an electro-magnetic slip clutch device coupling said motive means with said member to cause operation of the first said means.

14. In combination, a plurality of alternating current circuits, means for controlling one of said circuits with respect to another thereof and comprising an actuating member, motive means comprising elements severally connected with said circuits and energized therefrom to cause relative movement between said elements at speeds in dependence on differences between the voltage frequencies of said circuits, and an electro-magnetic slip clutch device coupling said motive means with said member to cause operation of the latter at speeds variable in dependence on the speed of said motive means.

15. In combination, a plurality of alternating current circuits, means for controlling one of said circuits with respect to another thereof and comprising an actuating member, motive means comprising a stator having a coil connected with one of said circuits and energized therefrom and a rotor having a coil connected with said another of said circuits and energized therefrom to cause the rotation thereof at speeds variable in dependence on differences between the voltage frequencies of the said circuits, and a slip clutch device comprising a driving element driven by said rotor and a driven element spaced from said driving element and coupled with said member to cause operation of the first said means, the said driven element being operated responsive to movement of said driving element at speeds variable in dependence upon the speed of said rotor.

16. In combination, a plurality of alternating current circuits, means for controlling one of said circuits with respect to another thereof comprising a plurality of distributors each having a plurality of spaced contacts and a cooperating movable contact, motive means comprising a stator element connected with the said one of said circuits and energized therefrom and a rotor element connected with the said another of said circuits and energized therefrom to cause rotation of the last said element at speeds in dependence on differences between the voltage frequencies of said circuits, and a slip clutch comprising spaced driving and driven elements, the said driven element being coupled to said movable contacts and operable to move the latter to and from connection with successive ones of said associated contacts, and the said driving element being driven by said rotor and so disposed relative to said driven element as to transmit a torque to the latter dependent on the speed of said rotor.

HANS MÜLLER.